United States Patent [19]

Imamura et al.

[11] Patent Number: 5,699,410
[45] Date of Patent: Dec. 16, 1997

[54] AUTOMATIC TELEPHONE ANSWERING APPARATUS

[75] Inventors: Natsuko Imamura, Ooita; Shinji Takakura, Fukuoka, both of Japan

[73] Assignee: Matsushita Electric Industrial Co., Ltd., Japan

[21] Appl. No.: 493,312

[22] Filed: Jun. 21, 1995

[30] Foreign Application Priority Data

Jun. 23, 1994 [JP] Japan .................................. 6-141698

[51] Int. Cl.$^6$ .......................... H04M 11/00; H04M 1/00
[52] U.S. Cl. ........................ 379/67; 379/373; 379/375; 379/89
[58] Field of Search ........................ 379/372, 373, 379/374, 375, 376, 188, 199, 67, 88, 89, 82, 107

[56] References Cited

U.S. PATENT DOCUMENTS

| | | | |
|---|---|---|---|
| 4,459,435 | 7/1984 | Foldvary | 379/199 |
| 4,591,664 | 5/1986 | Freeman | 379/212 |
| 5,040,209 | 8/1991 | Greenberg et al. | 379/373 |
| 5,142,569 | 8/1992 | Peters et al. | 379/373 |
| 5,388,150 | 2/1995 | Schneyer et al. | 379/142 |
| 5,390,236 | 2/1995 | Klausner et al. | 379/88 |
| 5,400,393 | 3/1995 | Knuth et al. | 379/67 |
| 5,432,844 | 7/1995 | Core et al. | 379/67 |
| 5,475,737 | 12/1995 | Garner et al. | 379/373 |
| 5,491,746 | 2/1996 | Pinard | 379/373 |

Primary Examiner—Fan Tsang
Attorney, Agent, or Firm—Rossi & Associates

[57] ABSTRACT

An automatic telephone answering apparatus comprises: an interface circuit for communicating with a telephone line; a memory for storing a plurality of blocks of sound data; a sound reproducing circuit for reproducing one of blocks of sound data; a ring signal detection circuit for detecting a ring signal having predetermined types of data patterns; a data pattern detection portion for detecting which one of said predetermined types of data pattern said detected ring signal has; and a control portion for communicating with said telephone line using said interface circuit and then, reproducing and sending said one of blocks of sound data in accordance with said detected data pattern using said sound reproducing means to said telephone line. The data patterns are assigned to one telephone line and are detected by measuring ringing and ring mute periods of the ring signal. This apparatus further comprises a mail box portion having mail boxes assigned to the data patterns respectively, so that first out-going messages are provided to mail boxes respectively. A user of each mail box can listen to ICMs in the mail box assigned thereto. The user of the mail box at the outside location can know the presence of at least an ICM stored in the mail box by counting the cycles of the ring signal before this apparatus responds the user's call.

4 Claims, 6 Drawing Sheets

AUTOMATIC TELEPHONE ANSWERING APPARATUS

BACKGROUND OF THE INVENTION

1. Field of the Invention

This invention relates to an automatic telephone answering apparatus for communicating with a telephone line and sending and receiving a message or data.

2. Description of the Prior Art

An automatic telephone answering apparatus for automatically connecting to a telephone line in response to a ring signal and sending an out-going message and receiving and recording an incoming message is known. The user can listen the incoming message when he comes back.

Exchanges capable of providing IDENT A RING SERVICE are used at some locations in U.S.A. In this service, a plurality of telephone numbers are assigned to one telephone line and the exchange sends a ring signal with a pattern of the ring sound changed in accordance with the telephone number.

A private branch exchange generating a ring signal with a pattern of the ring sound changed between cases of a call coming from an outside location and a call of an extension call is known.

An automatic telephone answering apparatus having a mail box function is known. That automatic telephone answering apparatus has a memory for storing messages. In this apparatus, in response a call, a common out-going message guiding a selection of a mail box is sent to the caller at first and then, in response to a selection by the caller which mail box the caller access to. Another out-going message in the selected mail box is sent to the caller. Then, the caller's message, that is, an incoming message is recorded in the selected mail box. Therefore, this automatic telephone answering apparatus having the mail box function acts as a plurality of automatic answering telephone apparatus provided to respective users.

An automatic answering telephone answering apparatus having a toll saver function is know. A user of this automatic answering telephone answering apparatus can know whether or not a new incoming message has been recorded from an outside location by counting the number of the generated ring sounds for the automatic answering telephone answering apparatus. For example, if there is at least a incoming message which has not been heard, the automatic answering telephone answering apparatus responses the call after it has received the ring signal twice. If there is no incoming message which has not been heard, the automatic answering telephone answering apparatus responses the call after it has received the ring signal four times. Therefore, at the instance that the ring signal is sent three times, the user knows that there is no message which has not been heard. This saves the toll of the call.

SUMMARY OF THE INVENTION

The aim of the present invention is to provide an improved automatic answering telephone apparatus.

According to the present invention there is provided a first automatic telephone answering apparatus comprising: an interface circuit for communicating with a telephone line; a storing portion for storing a plurality of blocks of sound data at storing regions thereof respectively; a sound reproducing portion for reproducing one of blocks of the sound data; a ring signal detection portion for detecting a ring signal from the telephone line, the ring signal having predetermined types of data patterns; a data pattern detection portion for detecting which one of the predetermined types of data pattern the detected ring signal has; and a control portion for communicating with the telephone line using the interface circuit in response to the ring signal from the ring signal detection portion and then, reproducing and sending one of blocks of sound data in accordance with the detected data pattern using the sound reproducing portion to the telephone line.

The data patterns are assigned to one telephone line and are detected by measuring ringing and ring mute periods of the ring signal. This apparatus further comprises a mail box portion having mail boxes assigned to the data patterns respectively, so that first out-going messages are provided to mail boxes respectively. A user of each mail box can listen to incoming messages in the mail box assigned thereto. The user of the mail box at the outside location can know the presence of at least an ICM stored in the mail box by counting the cycles of the ring signal before this apparatus responds the user's call.

According to the present invention there is also provided a second automatic telephone answering apparatus comprising: an interface circuit for communicating with a telephone line; a storing portion for storing a plurality of blocks of sound data at storing regions respectively; a sound reproducing portion for reproducing one of blocks of sound data; a mail box unit, having a plurality of mail box portions storing data indicative of the storing regions respectively; a ring signal detection portion for detecting a ring signal from the telephone line, the ring signal having predetermined types of data patterns; a data pattern detection portion for detecting which one of the predetermined types of data pattern the detected ring signal has; a control portion for determining one of the mail box portions in accordance with the detected data pattern, communicating with the telephone line using the interface circuit and then, reproducing and sending one of blocks of sound data in accordance with the data in one of the determined mail box using the sound reproducing portion to the telephone line.

According to this invention there is provided a third automatic telephone answering apparatus comprising: an interface circuit for communicating with a telephone line; a first storing portion for storing a plurality of blocks of first sound data at first storing regions thereof respectively; a second storing portion for storing a plurality of blocks of second sound data at second storing regions thereof respectively; a sound reproducing portion for reproducing the first and second sound data; a ring signal detection portion for detecting a ring signal from the telephone line, the ring signal having predetermined types of data patterns; a data pattern detection portion for detecting which one of the predetermined types of data pattern the detected ring signal has; a first control portion for communicating with the telephone line using the interface circuit in response to the ring signal from the ring signal detection portion and then, reproducing and sending one of blocks of the first sound data in accordance with the detected data pattern using the sound reproducing portion; a third storing portion for storing a plurality of data; a second control portion responsive to the first control portion for receiving a sound signal, which may be sent from a caller through the telephone line in response to the sent one of blocks of first sound data, from the telephone line via the interface circuit, determining one of the second storing regions in accordance with the detected data pattern, storing the received sound signal as the second sound data at the determined one of second storing regions, and storing the data indicative of the determined one of second storing regions in the third storing portion; an operation portion for receiving an operation command; and a third control portion responsive to the operation portion for determining which one of the plurality of data corresponds to the operation command and reproducing one of blocks of the second sound data from the second storing portion in accordance with the determined data using the sound reproducing portion.

According to the present invention there is also provided a fourth automatic telephone answering apparatus comprising: an interface circuit for communicating with a telephone line; a first storing portion for storing a plurality of blocks of first sound data at first storing regions thereof respectively; a second storing portion for storing a plurality of blocks of second sound data at second storing regions thereof respectively; a sound reproducing portion for reproducing one of blocks of the first and second sound data; a mail box unit, having a plurality of mail box portions storing first data of the first storing regions and second data of the second storing regions, and third data indicative of the presence or absence of the second sound data in the second storing portion directed to the mail box portions respectively; a ring signal detection portion for detecting a ring signal from the telephone line, the ring signal having predetermined types of data patterns; a data pattern detection portion for detecting which one of the predetermined types of data pattern the detected ring signal has; a counting portion responsive to the data pattern detection portion for counting cycles of one of the predetermined types of data pattern; a first control portion responsive to the ring signal detection portion for determining one of the mail box portions in accordance with the detected data pattern, communicating with the telephone line using the interface circuit when the counted cycles reaches a first number when the third data in the determined mail box portion indicates the presence of the second sound data or when the counted cycles reaches a second number when the third data in the determined mail box portion indicates the absence of the second sound data, then, reproducing and sending one of blocks of first sound data in accordance with the first storing region stored in the determined mail box using the sound reproducing portion to the telephone line, the first number being different from the second number; a second control portion responsive to the first control portion for receiving a sound signal, which may be sent from a caller in response to the sent one of blocks of first sound data, from the telephone line via the interface circuit, determining one of the second storing regions in accordance with the detected data pattern, storing the received sound signal as the second sound data at the determined one of the second storing regions, and storing the second data indicative of the determined one of the second storing regions, and storing the third data indicative of the presence of the second data in the determined mail box portion; an operation portion for receiving an operation command; and a third control portion responsive to the operation portion for reproducing one of hocks of second sound data in accordance with one of second storing regions stored in one of mail box portions indicated by the operation command using the sound reproducing portion.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
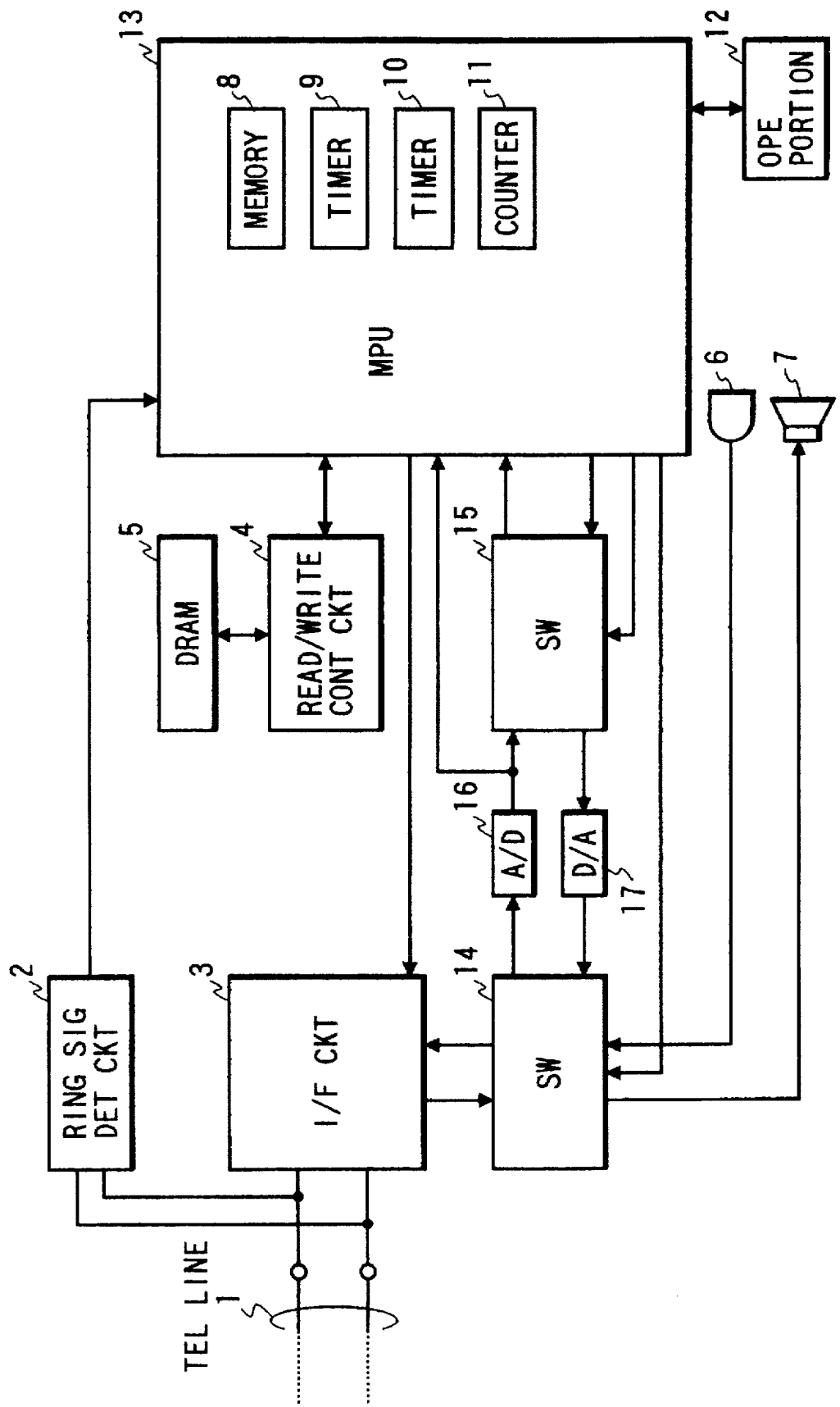
FIG. 1 is a block diagram of an automatic telephone answering apparatus of this invention.

Hereinbelow will be described an embodiment of this invention. FIG. 1 is a block diagram of an automatic telephone answering apparatus of this invention. This automatic telephone answering apparatus comprises an interface circuit 3 for communicating with a telephone line 1, a microphone 6 for receiving a sound and generating a first sound signal, a speaker 7 for reproducing a second sound signal, a DRAM 5 for storing sound data and other data, a read/write control circuit 4 for reading sound data or the like from the DRAM 5 and writing sound data and other data in the DRAM 5, switches 14 and 15 for controlling signal passages to or from the read/write control circuit 4, an a/d converter 16 for a/d converting the analog sound signal to the read/write control circuit 4, a d/a converter 17 for d/a converting a digital sound signal from the read/write control circuit 4, a ring signal detection circuit 2 for detecting a ring signal, a microprocessor (MPU) 13 for effecting an operation of this automatic telephone answering apparatus in accordance with a program stored therein, and an operation portion 12, having a off-hook switch, twelve-keys, and other operation keys, for receiving an operation command from a user such as a dialing operation and commands of automatic answering functions, and providing operational information to the user.

The microprocessor 13 includes a memory 8 for storing data such as count data, a timer 9 for measuring a time interval, namely, a ring signal period, a timer 10 for measuring a time interval, namely, a ring signal mute period, and a counter 11 for counting an event, i.e., the number of occurrences of the ring signal periods.

The ring signal detection circuit 2 receives a ring signal and outputs a detected ring signal such that the detected ring signal shows a H logic level for a ring sound period and a L logic level for a ring sound mute period and the microprocessor 13 receives the output of the ring signal detection circuit 2.

When an out-going (OGM) is recorded, under the control of the microprocessor 13, the switching circuit 14 supplies the sound signal from the microphone 6 to the a/d converter 16 which a/d converts the sound signal to a digital sound signal and under the control of the microprocessor 13 and the switch 15 supplies the digital sound signal to the read/write control circuit 4. The read/write control circuit 4 stores the digital sound signal in the DRAM 5.

When an incoming (ICM) is recorded, under the control of the microprocessor 13, the switching circuit 14 supplies the sound signal from the interface circuit 3 to the a/d converter 16 which a/d converts the sound signal to a digital sound signal and under the control of the microprocessor 13 and the switch 15 supplies the digital sound signal to the read/write control circuit 4. The read/write control circuit 4 stores the digital sound signal in the DRAM 5.

When an out-going message is sent to the telephone line 1, the out-going message is read by the read/write control circuit 4 under the control of the microprocessor 13, the read digital sound signal is supplied to the d/a converter 17 which converts the digital sound signal to an analog sound signal and the switch 14 supplies the analog sound signal to the interface circuit 3.

When an incoming message is reproduced, the incoming message is read by the read/write control circuit 4 under the control of the microprocessor 13, the read digital sound signal is supplied to the d/a converter 17 which converts the digital sound signal to an analog sound signal and the switch 14 supplies the analog sound signal to the speaker 7.

When data from the microprocessor 13 is stored in the DRAM 5, the switch 15 supplies data from the microprocessor 13 to the read/write control circuit 4 under the control of the microprocessor 13 and the read/write control circuit 4 stores the data in the DRAM 5.

When data in the DRAM 5 is read by the read/write control circuit 4, the switch 15 supplies the read data to the microprocessor 13.

The interface circuit communicates with the telephone line 1 under the control of the microprocessor 13.

Figure 2:
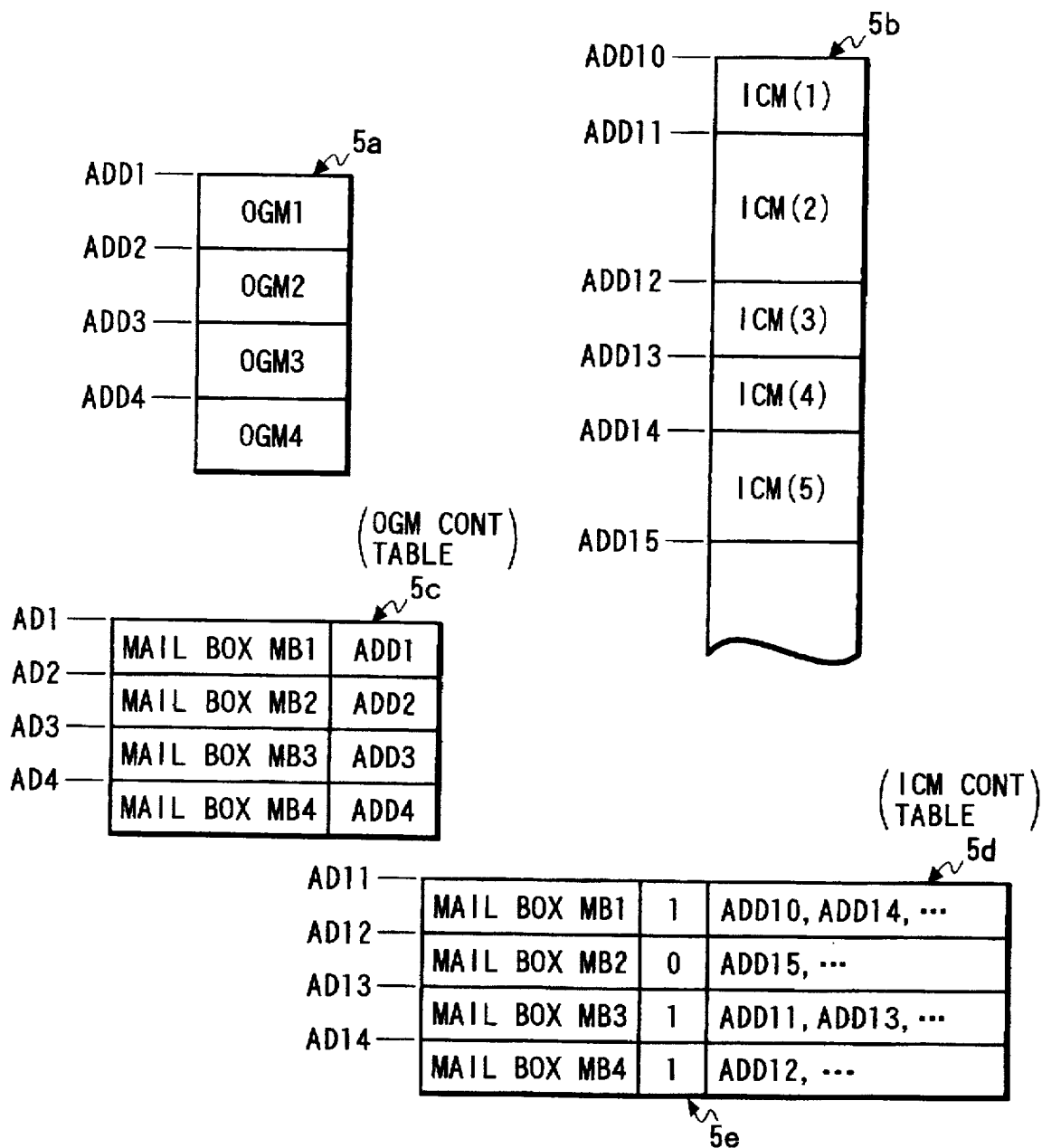
FIG. 2 is an illustration of portions of a memory map of the DRAM shown in FIG. 1.

FIG. 2 is an illustration of portions of a memory map of the DRAM 5. A portion 5a shows memory areas storing out-going messages 1 to 4 with respective start addresses ADD1 to ADD4 of the DRAM 5. A portion 5b shows memory areas storing incoming messages 1 to 5 with respective start addresses ADD10 to ADD15 of the DRAM 5. These addresses ADD1 to ADD4 are varied with the length of the messages recorded in the DRAM 5.

A portion 5c shows memory areas storing the starting addresses of the out-going messages 1 to 4 with respective start addresses AD1 to AD4 of the DRAM 5. These addresses AD1 to AD4 are predetermined. Therefore, this portion 5c acts as an out-going message control table and in these addresses AD1 to AD4, mail boxes mb1 to mb4 are assigned for out-going messages and store starting addresses of out-going messages respectively.

A portion 5d shows memory areas storing the starting addresses of the incoming messages 1 to 5 with respective start addresses AD11 to AD14 of the DRAM 5. These addresses AD11 to AD14 are predetermined. Therefore, this portion 5d acts as an incoming message control table. These memory areas also respectively includes data 5e indicating whether the incoming message which has not been heard is present in the DRAM 5. In these addresses AD11 to AD14, mail boxes mb1 to mb4 are assigned and store starting addresses of incoming messages. For example, the mail box mb1 stores starting addresses ADD10 and ADD14 or the like.

Figure 6:
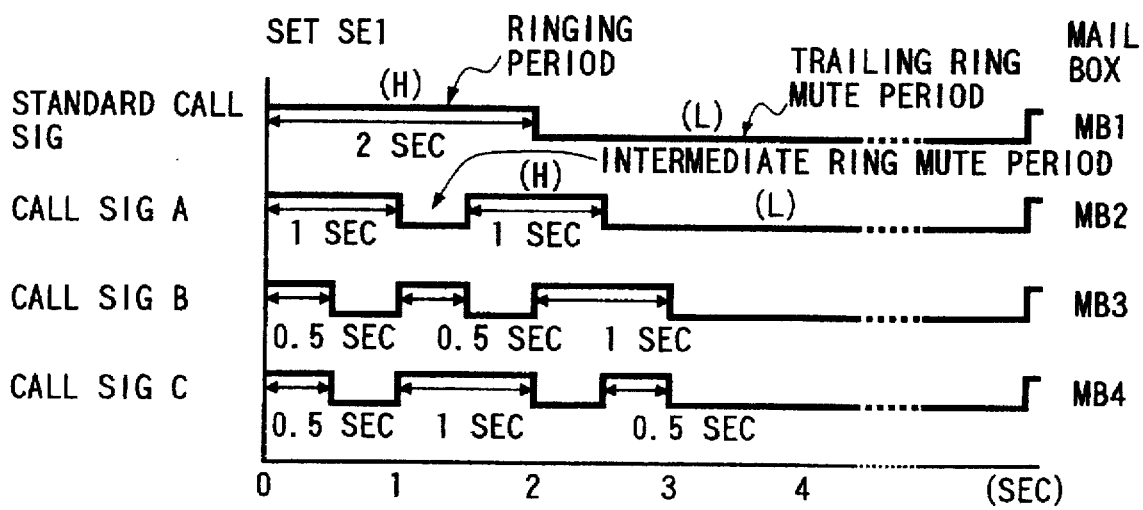
FIG. 6 is an illustration of patterns of the ring signal of this invention.
Figure 6:
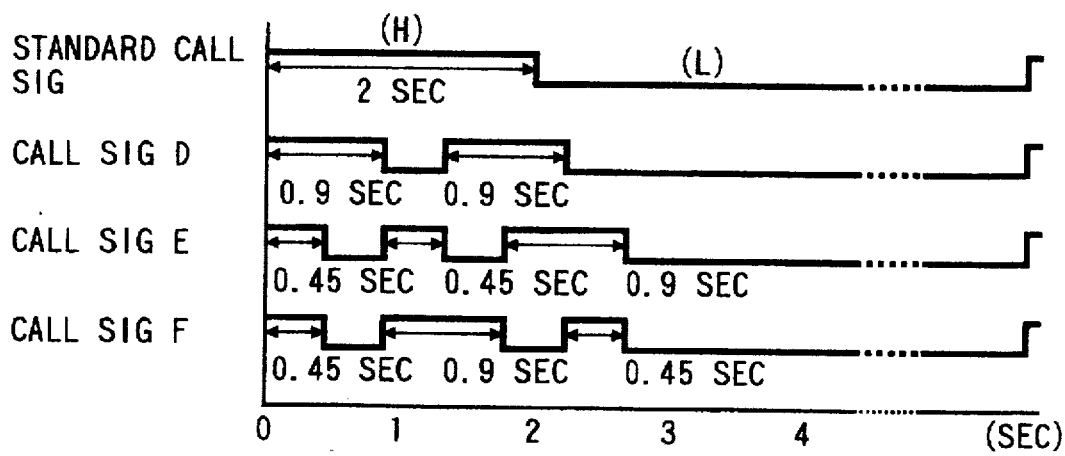
Figure 6:
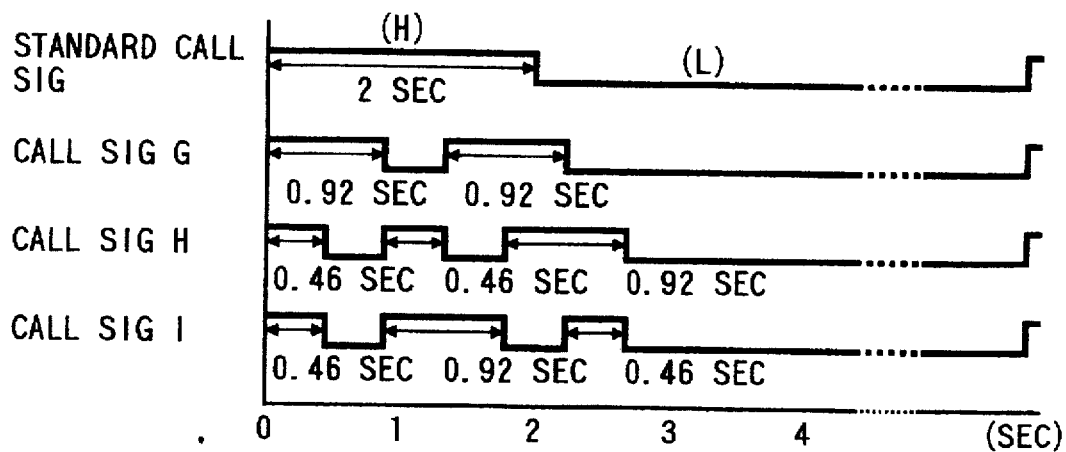

FIG. 6 is an illustration of patterns of the ring signal of this invention. In the IDENT A RING SERVICE in the U.S.A., there are three sets of call signals. In each set, there are three types of call signals. Each of call signals is represented by the combination of ringing periods and ring mute periods.

In set se1, a standard call signal has a two seconds of ringing period and a four seconds of ring mute period in one cycle. The call signals other than the standard call signal have at least one long ring period which is 0.9 to 1.0 second and at least one short ring period which is 0.45 to 0.5 seconds.

Moreover, a call signal A has the long ring period, and then, a ring mute period of 0.5 seconds, and then the long ring period again, and a ring mute period of 3.5 to 3.45 seconds in one cycle and is called as double rings.

A call signal B has the short ring period, and then, a ring mute period of 0.5 seconds, then the short ring period again, the ring mute period of 0.5 seconds, and then the long ring period, and a ring mute period of 3.0 to 3.3 seconds in one cycle and is called as triple rings.

A call signal C has the short ring period, then, a ring mute period of 0.5 seconds, then the long ring period, the ring mute period of 0.5 seconds, and then the short ring period, and a ring mute period of 3.0 to 3.3 seconds in one cycle and is called as triple rings.

This telephone apparatus has four mail box mb1 to mb4 and the mail box mb1 corresponds to the standard call signal, the mail box mb2 corresponds to the call signal A, the mail box mb3 corresponds to the call signal B, and the mail box mb4 corresponds to the call signal C. That is, for example, if there is a call with the call signal B, the mail box mb3 is opened.

Operation of the telephone apparatus of this embodiment will be described.

At first, an out-going message recording operation will be described. When a user inputs a command indicative of the mail box mb1 with the operation portion 12, the microprocessor 13 operates the read/write control circuit 4 to enter the read/write control circuit 4 in a recording mode to start the recording. In this condition, when an out-going message message is inputted by the microphone 6 as the sound signal, the sound signal is converted into the digital sound signal by the a/d converter 16 and stored in the DRAM 5 from the start address add1 and the start address add1 is stored in the predetermined address ad1 assigned to the mail box mb1. When the recording has finished, the user commands the end of the recording with the operation portion 12. Then, the microprocessor 13 operates the read/write control portion 4 to finish the recording mode. Therefore, the out-going message ogm1 is recorded in the DRAM 5 as shown in FIG. 2. That is, the out-going message ogm1 for the mail box mb1 is recorded in the DRAM from the start address add1 and the start address add1 is stored in the out-going message control table 5c from the predetermined start address ad1 for the mail box mb1. Similarly, when another user inputs a command indicative of the mail box mb2 with the operation portion 12, the microprocessor 13 operates the read/write control circuit 4 to recording the out-going message ogm2 in the DRAM 5 as shown in FIG. 2. That is, the out-going message ogm2 for the mail box mb2 is recorded in the DRAM 5 from the start address ADD2 which is determined to the end address of the out-going message ogm1 and the start address add2 is stored in the out-going message control table 5c from the predetermined start address ad2 for the mail box mb2. Other out-going messages for other mail boxes are similarly recorded.

An arrival of a call will be described. When there is a call, the ring signal detection circuit detects the ring signal having patterns mentioned above from the telephone line 1 and supplies the detected ring signal to the microprocessor 13. That is, the ring signal detection circuit performs a wave-shaping the ring signal and outputs the logic H level indicative of a ringing period and the logic L level indicative of the ringing mute period.

Figure 3:
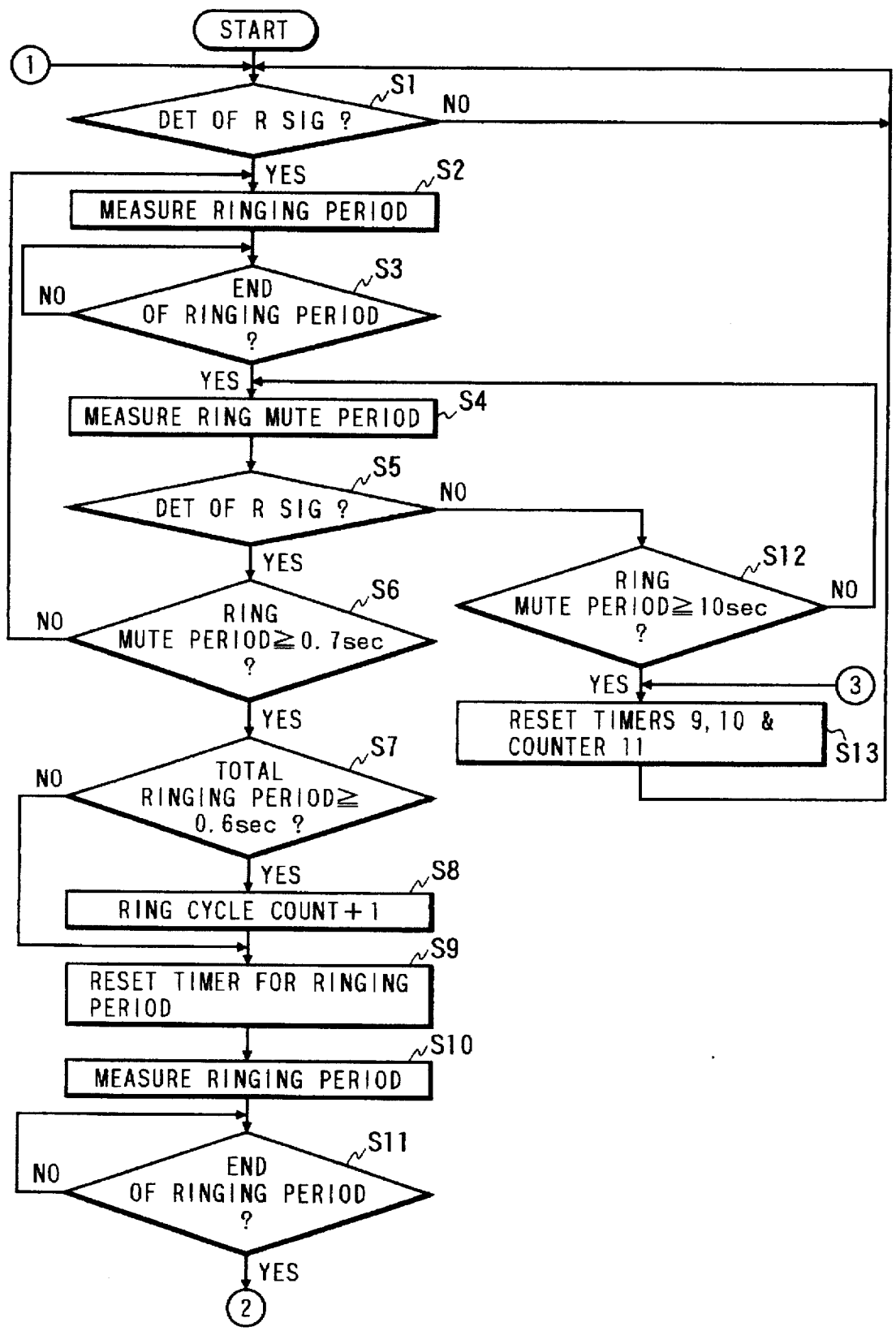
FIGS. 3 to 5 are diagrams of a flow chart representing the operation of the microprocessor shown in FIG. 1.
Figure 4:
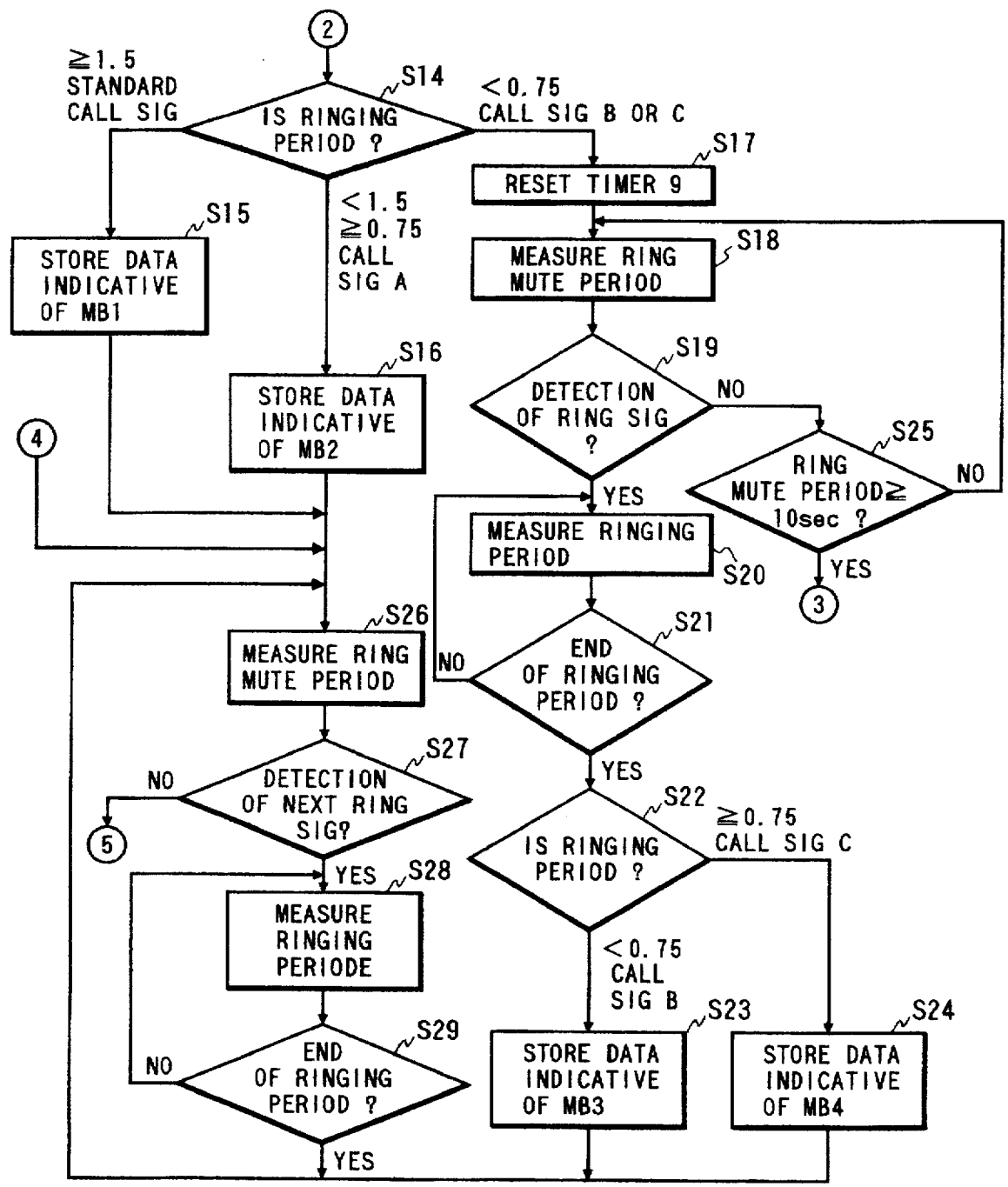
Figure 5:
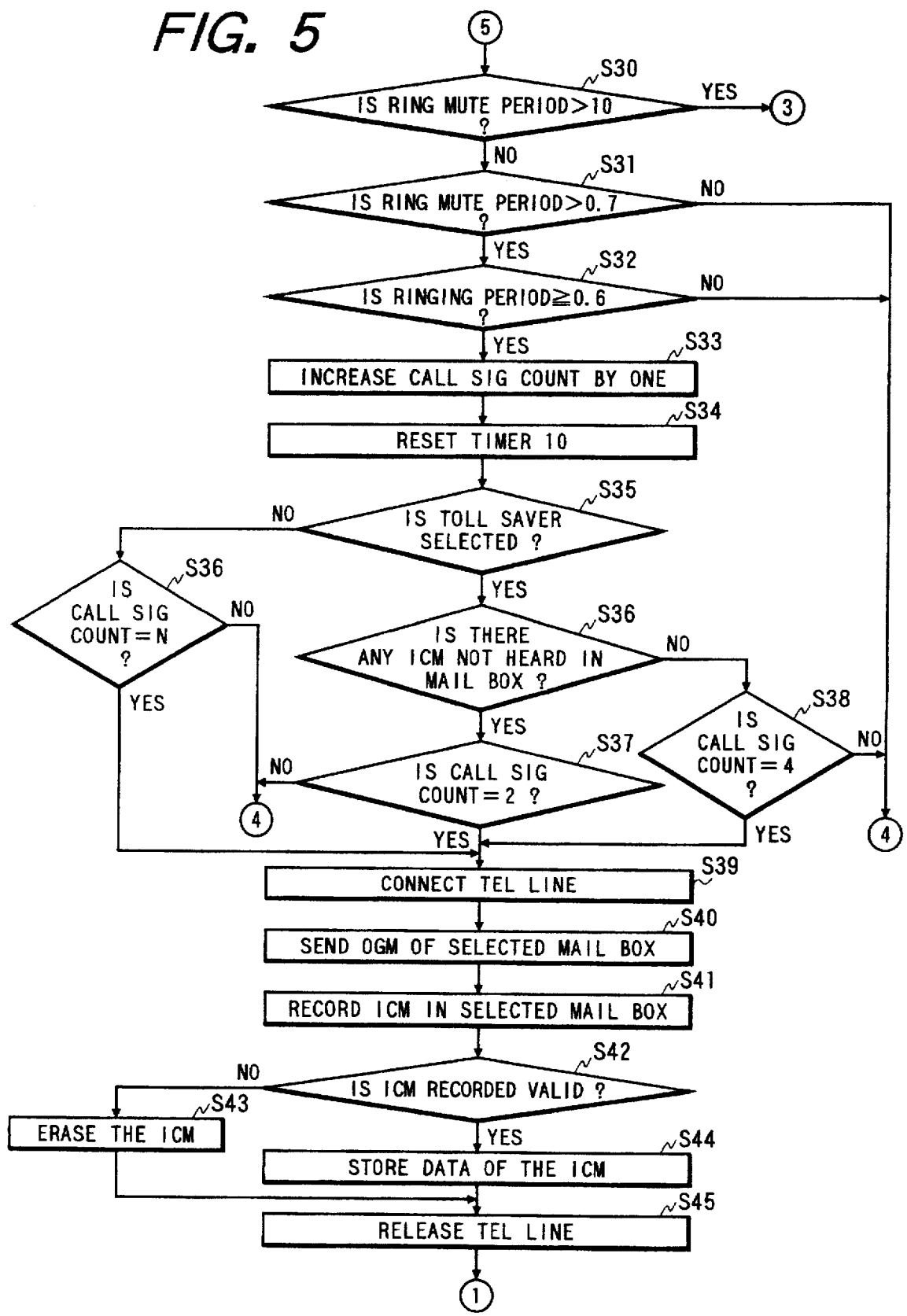

FIG. 3 is a diagram of a flow chart representing the operation of the microprocessor 13. The microprocessor 13 executes the processing represented by the flow chart shown in FIG. 3 in accordance with the program stored therein. The microprocessor 13 waits the detection of the ring signal in step s1 and when the microprocessor 13 receives the detected ring signal having a transition from the logic L to the logic H, the microprocessor 13 starts the timer 9 for measuring the ringing period in step s2. In the following step s3 if the ringing period has finished, that is, there is a transition from the logic H to the logic L in the detected ring signal, processing proceeds to step s4. The microprocessor 13 stops the timer 9 and starts the timer 10 to measure the ring mute period at the transition from the logic H to the logic L in step s4. In step s5, if there is a transition from the logic L to the logic H level, the microprocessor 13 makes a decision as to whether or not the ring mute period is equal to or larger than 0.7 seconds in step s8. That is, all ring mute periods between the ringing periods are 0.5 seconds. Therefore, if the ring mute period is equal to or larger than 0.7 seconds, this period is judged as a training ring mute period. Thus, it is judged that one cycle of the call signal has finished.

If the ring mute period is shorter than 0.7 seconds, processing returns to step s3 because the ring mute period is of the intermediate ring mute period between the two consecutive ringing periods and the microprocessor 13 repeats the processing from the step s2 to step s8 until one cycle of the call signal has finished.

After the ring mute period is equal to or larger than 0.7 seconds (step s6) and the following ring signal is detected (step s5), a total ringing period in the previous cycle of the call signal is judged in step s7. That is, the microprocessor 13 makes a decision as to whether the total ringing period in this call signal cycle is equal to or larger than 0.6 seconds. If the total ringing period is equal to or larger than 0.6 seconds, the microprocessor increases a ring cycle count in the counter 11 by one in step s8 and processing proceeds to step s9. If the total ringing period is shorter than 0.6 seconds, the microprocessor 13 does not increase the ring cycle count because the ring signal is not valid because the total ringing period is too short and processing directly proceeds to step s9.

This decision in step s7 may be provided as to whether the recent ringing period is larger than 0.4 seconds. In that case, if the recent ringing period is larger than 0.4 seconds, processing proceeds to step s8 and if no, processing proceeds to step s9.

In step s9, the microprocessor 13 resets the timer 9 for measuring the ringing period.

In the following steps s10 and s11, the microprocessor 13 starts the timer 9 to measure the ringing period again.

The above-mentioned processing mainly determine the start of the second cycle of the call signal because the call signal is not always supplied from the top portion thereof. Therefore, the type of the call signal is determined after the finish of the first cycle of the call signal in accordance with the ringing periods and the ring mute periods.

During measuring the ring mute period in the loop of steps s4, s5, and s12, if the ring mute period exceeds 10 seconds, the microprocessor 13 judges that the transmission of the call signal stops in step s13. Then, the microprocessor 13 resets the timers 9 and 10 and the counter 11 and processing returns to step s1.

The judgement of the type of the call signal starts at the step s10. In step s10, the microprocessor 13 measures the ringing period with the timer 9 and the microprocessor 13 detects the end of the ringing period in step s11. Then, the microprocessor 13 classifies the ringing period into three classes in step s14. If the ringing period is equal to or larger than 1.5, the microprocessor 13 judges that the call signal is of the standard call signal, so that the microprocessor 13 stores data indicative of the mail box mb1 assigned to the standard call signal into the memory 8 in step s15. If the ringing period is smaller than 1.5 and equal to or larger than 0.75, the microprocessor 13 judges that the call signal is of the call signal A, so that the microprocessor 13 stores data indicative of the mail box mb2 assigned to the call signal A into the memory 8 in step s16. If the ringing period is smaller than 0.75, the microprocessor 13 judges that the call signal is of the call signal A or B. Then, the microprocessor 13 resets the timer 9 in step s17 and starts the timer 10 to measure the ring mute period at the transition from the logic H to the logic L in step s18. In step s19, if there is a transition from the logic L to the logic H level, the microprocessor 13 starts the timer 9 to measure the ringing period again in step s20. Then, when the end of the ringing period is detected in step s21, the microprocessor 13 classifies the ringing period into two classes in step s22. If the ringing period is larger than 0.75, the microprocessor 13 judges that the call signal is of the call signal B, so that the microprocessor 13 stores data indicative of the mail box mb8 assigned to the standard call signal into the memory 8 in step s23. If the ringing period is equal to or smaller than 0.75, the microprocessor 13 judges that the call signal is of the call signal C, so that the microprocessor 13 stores data indicative of the mail box mb4 assigned to the call signal C into the memory 8 in step s24.

During measuring the ring mute period in the loop of steps s18, s19, and s25, if the ring mute period exceeds 10 seconds, the microprocessor 13 judges that the transmission of the call signal stops. Then, the microprocessor 13 resets the timers 9 and 10 and the counter 11 in step s13 and processing returns to step s1.

As described the call signal is classified into the standard call signal and call signals A, B, or C and the microprocessor 13 determines which mail box the call is accessed.

Then, processing determining the number of the detection of the call signal and the processing concerning to the toll saver function will described.

In step s26, the microprocessor 13 starts the timer 10 to measure the ring mute period at a transition from the logic H to the logic L. In step s27, if there is the next ring signal, that is, a transition from the logic L to the logic H level, in the following steps s28 and s29, the microprocessor 13 starts the timer 9 to measure that ringing period and processing returns to step s26. In step s27, if there is no next ring signal, processing proceeds to step s30.

In step s30, the microprocessor 13 checks whether the ring mute period is larger than 10 seconds. If the ring mute period is larger than 10 seconds, it is judged that the transmitting of the call signal has finished, so that the microprocessor 13 resets the timers 9 and 10 and the counter 11 and processing returns to step s1. If the ring mute period is not larger than 10 seconds, the microprocessor 13 makes a decision as to whether the ring mute pride is larger than 0.7 seconds. If the ring mute period is not larger than 0.7 seconds, processing returns to step s26. If the ring mute period is larger than 0.7 seconds processing proceeds to step s32. That is, during the measuring the ring mute period in the loop having step from s26 via s27, s30, and s31 to s26, if the ring mute period is larger than 0.7 seconds, that is, processing is in the trailing ring mute period, processing proceeds to step s32. This means that one cycle of the call signal has finished. On the other hand, if the next ring signal is detected before the ring mute period has passed for 0.7 seconds, which means one cycle of the call signal has not finished, the microprocessor 13 measures the ring mute period again to detect the trailing ring mute period in step s28.

In step s32, the microprocessor 13 makes a decision as to whether the total ring period of this cycle of the call signal is equal to or larger than 0.6 seconds. If the total ring period is smaller than 0.6 seconds, processing returns to step s26. If the total ring period of this cycle of the call signal is equal to or larger than 0.6 seconds, the microprocessor 13 judges that this cycle of the call signal has received essentially. Thus, the microprocessor 13 increases the call signal count by one in step s33 and resets the timer 10 in step s34.

This decision in step s32 may be provided as to whether the recent ringing period is larger than 0.4 seconds. In that case, if the recent ringing period is larger than 0.4 seconds, processing proceeds to step s33 and if no, processing proceeds to step s26.

In the following step s35, the microprocessor 13 checks data indicating that the toll saver mode is selected in the memory 8. This data is set by the user with the operation portion 12 before start of this processing. If the toll saver mode is not selected, the microprocessor makes a decision as to whether the call count reaches a predetermined value N which is a natural number. If No, processing returns to step s26 because the call signal has not received the predetermined N times. If the call count reaches the predetermined value N, the microprocessor 13 operates the interface circuit 3 to connect this telephone apparatus to the telephone line.

In step s35, if the toll saver function is selected, the microprocessor 13 makes a decision as to whether there is any incoming message in the mail box, which has not heard, by checking the memory area 5e in step s36. If there is no incoming message which has not heard in the mail box, the microprocessor makes a decision as to whether the call signal count reaches four in step s38. If the call signal count does not reach four, processing returns to step s26 until the call signal count reaches four.

If the call signal count reaches four in step s38, the microprocessor 13 operates the interface circuit 3 to connect this telephone apparatus to the telephone line.

In step s36 if there is at least an incoming message in the mail box which has not heard, the microprocessor 13 makes a decision as to whether the call signal count reaches two in step s37. If the call signal count does not reach two, processing returns to step s26 until the call signal count reaches two. If the call count reaches two, the microprocessor 13 operates the interface circuit 3 to connect this telephone apparatus to the telephone line in step s39. That is, if the user calls this telephone apparatus, the user can know that there is at least one incoming message which has not heard by the user if there is two cycle of the call signal until this telephone apparatus connects the telephone line and the user can know that there is no incoming message which has not heard by the user if there is four cycle of the call signal until this telephone apparatus connects the telephone line in the toll save mode.

In the following step s40, the microprocessor 13 sends the out-going message of the selected mall box using the out-going message control table 5c. Then, the microprocessor receives and record the incoming message which may be sent by the caller in response to the out-going message using the incoming message control table 5d in step s41. In the following step s42, the microprocessor 13 makes a decision as to whether the recording of this incoming message is valid. If the recording of this incoming message is not valid, the microprocessor 13 erases the incoming message by not renewing the incoming message control table 5d. If the recording of this incoming message is valid, the microprocessor 13 stores the start address of the incoming message in the incoming message control table 5d. This judgement is made such that the microprocessor 13 checks whether there are more than three large changes in the digital sound signal from the a/d converter 16.

In the following step s45, the microprocessor 13 releases the telephone line 1 and processing returns to step s1.

When the user inputs the mail box number data and performs the reproducing operation with the operation portion 12, the microprocessor 13 reads the starting address of at least one incoming message and supplies the starting address to the read/write control circuit 4 and reproduces the incoming message. For example, as shown in FIG. 2, there are two messages in the mail box mb1 and the data 5e represents the presence ("1") of the incoming message not heard. Then, the microprocessor 13 reproduces the incoming message icm(1) and then, incoming message icm(5) stored from the starting addresses add10 and add14.

When these incoming messages are reproduced, the microprocessor 13 stores "0" at the data area 5e in the mail box mb1.

As mentioned above, this automatic telephone answering apparatus detects which one of telephone numbers assigned to the telephone line the call directs to by analyzing the data pattern of the ring signal and sends one of out-going messages determined by the determined telephone number. Moreover, when an incoming message is recorded, one of mail boxes are automatically selected by the telephone number used, so that it is not necessary that the caller selects the mail box by sending a mail box number in response to the common out-going message requiring the selection.

What is claimed is:

1. An automatic telephone answering apparatus comprising:

an interface circuit for communicating with a telephone line;

storing means for storing a plurality of blocks of sound data at storing regions respectively;

sound reproducing means for reproducing one of the blocks of sound data;

mail box means, having a plurality of mail box portions including a plurality of mail box numbers, for storing data indicative of said storing regions respectively;

ring signal detection means for detecting a ring signal from said telephone line, said ring signal including a data pattern of a type corresponding to one of a plurality of predetermined types of data patterns, each of said data patterns including at least a ringing period and at least a ring mute period;

data pattern detection means, including ringing period measuring means for measuring said ringing period and ring mute period measuring means for measuring said ring mute period, said data pattern detection means detecting said data pattern of said ring signal in accordance with said ringing period measured by said ringing period measuring means and said ring mute period measured by said ring mute period measuring means, and detects the type of said data pattern of said ring signal, from said predetermined types of data patterns, in accordance with said detected data pattern of said ring signal;

mail box number storing means for storing data of said mail box numbers;

control means for determining one of said mail box portions and one of said mail box numbers in accordance with said detected type of said data pattern of said ring signal, storing data of the determined one of said mail box numbers in said mail box number storing means, communicating with said telephone line using said interface circuit and then, reproducing and sending said one of the blocks of sound data in accordance with said data of the determined one of said mail box numbers using said sound reproducing means to said telephone line.

2. An automatic telephone answering apparatus comprising:

an interface circuit for communicating with a telephone line;

first storing means for storing a plurality of blocks of first sound data at first storing regions thereof respectively;

second storing means for storing a plurality of blocks of second sound data at second storing regions thereof respectively;

sound reproducing means for reproducing one of blocks of said first and second sound data;

mail box means, having a plurality of mail box portions including a plurality of mail box numbers, for storing first data of said first storing regions and second data of said second storing regions respectively;

ring signal detection means for detecting a ring signal from said telephone line, said ring signal including a data pattern of a type corresponding to one of a plurality of predetermined types of data patterns;

data pattern detection means, including ringing period measuring means for measuring said ringing period and ring mute period measuring means for measuring said ring mute period, said data pattern detection means detecting said data pattern of said ring signal in accordance with said ringing period measured by said ringing period measuring means and said ring mute period measured by said ring mute period measuring means, detects the type of said data pattern of said ring signal, from said predetermined types of data patterns, in accordance with said detected data pattern of said ring signal;

mail box number storing means for storing data of said mail box numbers;

first control means responsive to said ring signal detection means for determining one of said mail box portions and one of said mail box numbers in accordance with said detected type of said data pattern of said ring signal, storing data of the determined one of said mail box numbers in said mail box number storing means, communicating with said telephone line using said interface circuit and then, reproducing and sending the determined one of the blocks of first sound data in accordance with said first storing region stored in the determined mail box portion using said sound reproducing means to said telephone line; and second control means responsive to said first control means for receiving a sound signal, which may be sent from a caller through said telephone line and said interface circuit in response to said sending of the determined one of the blocks of first sound data, determining one of said second storing regions in accordance with the stored data of the determined mail boxes number in said mail box number storing means, storing said received sound signal as said second sound data at the determined one of said second storing regions, and storing data indicative of the determined one of second storing regions in said determined mail box portion.

3. An automatic telephone answering apparatus comprising:

an interface circuit for communicating with a telephone line;

first storing means for storing a plurality of blocks of first sound data at first storing regions thereof respectively;

second storing means for storing a plurality of blocks of second sound data at second storing regions thereof respectively;

sound reproducing means for reproducing one of blocks of said first and second sound data;

mail box means, having a plurality of mail box portions storing first data of said first storing regions and second data of said second storing regions, and third data indicative of the presence or absence of said second sound data in said second storing means directed to said mail box portions respectively;

ring signal detection means for detecting a ring signal from said telephone line, said ring signal including a data pattern of a type corresponding to one of a plurality of predetermined types of data patterns;

data pattern detection means for detecting the type of the data pattern of said ring signal from said plurality of predetermined types of data patterns;

counting means responsive to said data pattern detection means for counting cycles of said detected type of data pattern of said ring signal;

first control means responsive to said ring signal detection means for determining one of said mail box portions in accordance with said detected type of data pattern, communicating with said telephone line using said interface circuit when said counted cycles reaches a first number when said third data in the determined mail box portion indicates presence of said second sound data or when said counted cycles reaches a second number when said third data in the determined mail box portion indicates absence of said second sound data, then, reproducing and sending one of said blocks of first sound data in accordance with said first storing region stored in the determined mail box using said sound reproducing means to said telephone line, said first number being different from said second number;

second control means responsive to said first control means for receiving a sound signal, which may be sent from a caller in response to said sending of one of said blocks of first sound data, from said telephone line via said interface circuit, determining one of said second storing regions in accordance with said detected data pattern, storing said received sound signal as said second sound data at the determined one of said second storing regions, and storing said second data indicative of the determined one of said second storing regions, and storing said third data indicative of the presence of said second data in the determined mail box portion;

operation means for receiving an operation command; and third control means responsive to said operation means for reproducing said one of blocks of second sound data in accordance with one of second storing regions stored in one of said plurality of mail box portions indicated by said operation command using said sound reproducing means.

4. An automatic telephone answering apparatus as claimed in claim 3, wherein each of said data pattern has at least a ringing period and at least a ring mute period and said data pattern detection means comprises:

ringing period measuring means for measuring said ringing period; and ring mute period measuring means for measuring said ring mute period, said data pattern detection means detecting said data pattern in accordance with said ringing period from said ringing period measuring means and said ring mute period from said ring mute period measuring means.

* * * * *